(12) United States Patent
Golikova et al.

(10) Patent No.: US 10,531,088 B2
(45) Date of Patent: Jan. 7, 2020

(54) ENCODER SLICE SIZE CONTROL WITH COST ESTIMATION

(71) Applicant: Intel Corporation, Santa Clara, CA (US)

(72) Inventors: Olga Golikova, Nizhny Novgorod (RU); Pavel Frolov, Moscow (RU); Alexey Fadeev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 15/535,512

(22) PCT Filed: Jan. 16, 2015

(86) PCT No.: PCT/IB2015/000225
§ 371 (c)(1),
(2) Date: Jun. 13, 2017

(87) PCT Pub. No.: WO2016/113585
PCT Pub. Date: Jul. 21, 2016

(65) Prior Publication Data
US 2017/0353723 A1    Dec. 7, 2017

(51) Int. Cl.
| *H04N 19/88* | (2014.01) |
| *H04N 19/174* | (2014.01) |
| *H04N 19/176* | (2014.01) |
| *H04N 19/124* | (2014.01) |

(52) U.S. Cl.
CPC ......... *H04N 19/124* (2014.11); *H04N 19/174* (2014.11); *H04N 19/176* (2014.11)

(58) Field of Classification Search
CPC .... H04N 19/124; H04N 19/132; H04N 19/15; H04N 19/174; H04N 19/176
USPC ...................................... 375/240.03
See application file for complete search history.

(56) References Cited

U.S. PATENT DOCUMENTS

| 5,301,032 A * | 4/1994 | Hong | H04N 19/105 |
| | | | 375/240.23 |
| 2007/0058723 A1* | 3/2007 | Chandramouly | H04N 19/61 |
| | | | 375/240.18 |
| 2008/0253448 A1* | 10/2008 | Lin | H04N 19/15 |
| | | | 375/240.03 |

(Continued)

FOREIGN PATENT DOCUMENTS

CN         102165772         8/2011

OTHER PUBLICATIONS

International Search Report and Written Opinion in corresponding PCT Application No. PCT/IB2015/000225 dated May 19, 2015.

(Continued)

*Primary Examiner* — James T Boylan
(74) *Attorney, Agent, or Firm* — Trop, Pruner & Hu, P.C.

(57) ABSTRACT

The video motion estimation (VME) unit of a graphics processor performs fast preprocessing prior to frame encoding to distribute macroblocks among slices based on weights of the macroblocks. The result of the preprocessing stage is iteratively improved based on the encoding stage. This allows real-time slice size limited encoding with minimum video quality reduction in some embodiments. Hardware preprocessing can be replaced with a software or hardware encoding step that gives macroblock weights (for example macroblock sizes after real encoding).

24 Claims, 3 Drawing Sheets

(56) References Cited

U.S. PATENT DOCUMENTS

| | | | | |
|---|---|---|---|---|
| 2009/0257666 A1* | 10/2009 | Kondou | ............... | H04N 19/139 |
| | | | | 382/233 |
| 2010/0128797 A1* | 5/2010 | Dey | .................... | H04N 19/176 |
| | | | | 375/240.24 |
| 2010/0275105 A1* | 10/2010 | Ouedraogo | .......... | H04N 19/176 |
| | | | | 714/776 |
| 2011/0113294 A1* | 5/2011 | Chugg | ............... | H03M 13/1128 |
| | | | | 714/704 |
| 2012/0281768 A1* | 11/2012 | Matsuba | ............... | H04N 19/91 |
| | | | | 375/240.24 |
| 2012/0300836 A1* | 11/2012 | Shimizu | ................. | H04N 19/15 |
| | | | | 375/240.08 |
| 2013/0114710 A1* | 5/2013 | Park | ................ | H04N 19/00569 |
| | | | | 375/240.12 |
| 2013/0128949 A1* | 5/2013 | Sezer | .................. | H04N 19/119 |
| | | | | 375/240.02 |
| 2014/0247876 A1* | 9/2014 | Moriya | ............... | H04N 19/176 |
| | | | | 375/240.12 |
| 2014/0341302 A1* | 11/2014 | Wang | .................. | H04N 19/176 |
| | | | | 375/240.26 |

OTHER PUBLICATIONS

Chinese Patent Office, First Office Action dated Sep. 25, 2019 in Chinese application No. 201580069058.4(PCT/IB2015/000225), 9 pages.

* cited by examiner

ENCODER SLICE SIZE CONTROL WITH COST ESTIMATION

BACKGROUND

This is related to video distribution over a network including video conferencing. Video transmission uses equally sized data packets, each packet containing a complete video decodable unit. A minimal decodable unit for modern compression formats is a slice. A slice is a spatially distinct region of a frame that is encoded separately from any other region of the same frame. But hardware encoders usually operate at the granularity of a frame for performance reasons.

If the hardware encoder is not designed to support a slice size limitation then it is not possible to break the frame into slices, because macroblock (MB) distribution in slices is predefined in advance for the frame. Without slice size control (when hardware encoder is a black-box for software user), some compressed video slices may exceed the slice size limit.

The encoded slice size must not exceed a defined level, but splitting a frame into slices reduces encoding efficiency and requires a higher bit rate for the same visual quality. This visual quality can be achieved by iteratively re-encoding the frame with different slice partitioning until the required slice size reached.

BRIEF DESCRIPTION OF THE DRAWINGS

Some embodiments are described with respect to the following figures.

DETAILED DESCRIPTION

Figure 1:
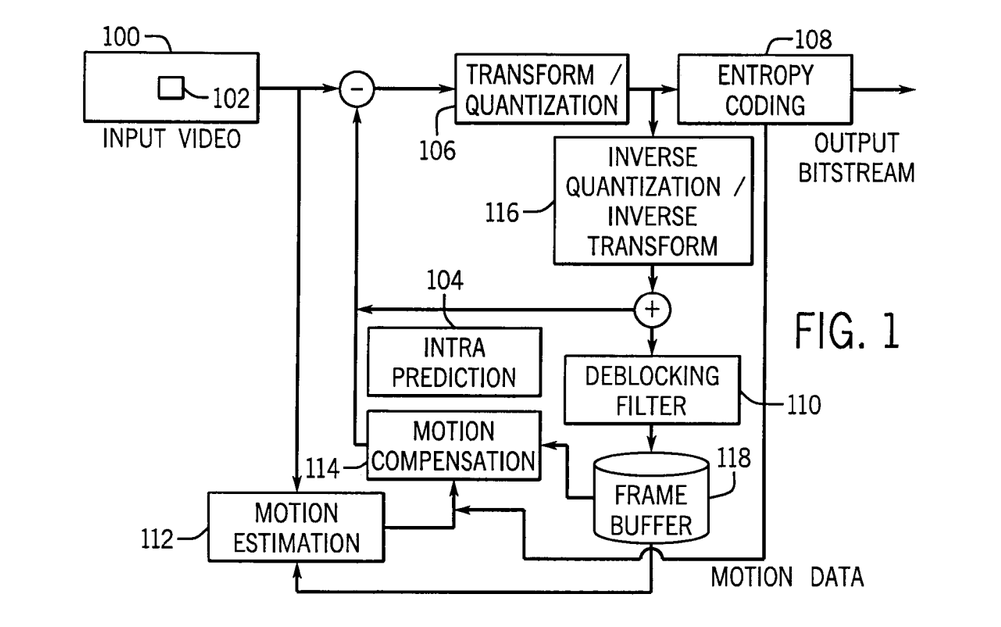
FIG. 1 is a block diagram for one embodiment.

Referring to FIG. 1, an exemplary encoding algorithm pursuant to the H.264/AVC standard is depicted. See ISO/IEC International Standard 14496-10 (MPEG-4 part 10 2/14) Advanced Video Coding available from ITU Telecommunication Standardization Section (ITU-T). The input video frame 100 is partitioned into blocks 102. Each block undergoes intra prediction 104 using neighboring reconstructed pixels. A prediction residue from intra prediction undergoes transformation 106 to decorrelate the data. Context adaptive variable length coding (CAVLC) may be employed to entropy code 108 scanned transformed coefficients. Alternatively, the transformed coefficients may be coded by context adaptive binary arithmetic coding (CABAC). To mitigate blocking artifacts, an adaptive in-loop deblocking filter 110 may be applied to the reconstruction from the feedback loop. The video motion estimation unit 112 determines the positions of motion vectors of moving objects within the picture 100. That motion data is then used by the motion compensation stage 114. The frequency transform block 106 transforms a macroblock into the spatial frequency domain. Then the frequency domain data is quantized. The quantization takes into account the range of data values for the current macroblock. An inverse frequency transform block 116 transforms the frequency domain data from the inverse quantization stage back to the spatial domain. The quantized data is encoded by entropy coding block 108 that employs fewer bits to encode more frequently used symbols and more bits to encode less frequently used symbols.

The video motion estimation (VME) unit of a graphics processor performs fast preprocessing prior to frame encoding to distribute macroblocks among slices based on weights of the macroblocks. The result of the preprocessing stage is iteratively improved based on the encoding stage. This allows real-time slice size limited encoding with minimum video quality reduction in some embodiments. Hardware preprocessing can be replaced with a software or hardware encoding step that gives macroblock weights (for example macroblock sizes after real encoding).

An application estimates a maximum number of iterations to guarantee real time encoding. For example, if encoding one frame takes 4 ms., and one frame cost estimation with decoding (or VME) takes less than 2 ms., then no more than 7 recoding iterations can be used and still achieve real time encoding.

Figure 2:
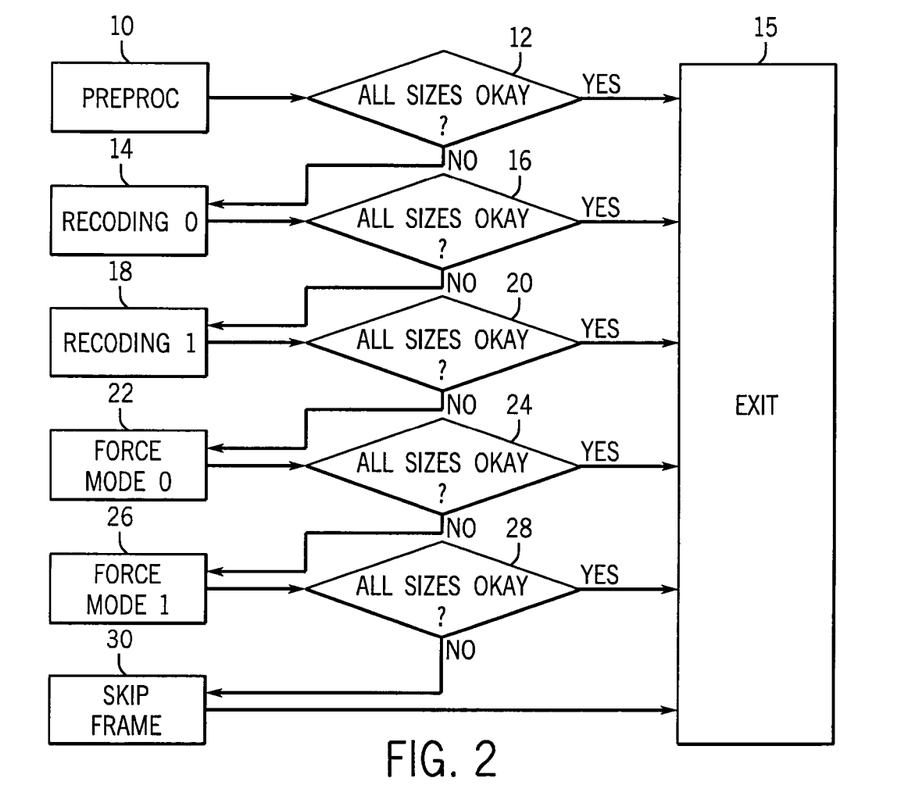
FIG. 2 is a flow chart for one embodiment.

The application can recode a frame using stages as shown in FIG. 2, until all encoded frame sizes are less than a defined level.

The application uses at least 3 stages: "trial run", "recoding 0" and "skip frame" to provide the slice size limitation. Increasing the number of stages can improve quality, but decreases performance.

The application can have more than six stages. In that case some stages can be repeated. For example: "trial run", "recoding 0", "recoding 1", "forced mode 0", "forced mode 0", "skip frame".

Referring to FIG. 2, preprocessing 10 to estimate slice sizes based on macroblock statistics can be accomplished with a hardware (VME) unit, a hardware PAK unit or by software encoding, to mention three examples. The macroblock statistics may include a macroblock complexity measure or cost distribution over the frame, plus the same data from previously encoded frames. Macroblock complexity may be estimated using cost functions such as sum of absolute differences (SAD), sum of squared differences (SSD), rate distortion (RD) cost, sum of absolute transformed differences (SATD), Haar cost function (used in VME) or encoded macroblock sizes.

As an alternative, the frame can be encoded and decoded. Coded macroblock lengths can be used as macroblock cost.

Preprocessing takes original and reference frames with required coding parameters as inputs and outputs estimated macroblock assignments to the equally sized slices. The parameters may be encoder initialization parameters such as bit rate, frame rate, or group of pictures structure to mention examples. The number of slices in the frame (numSlices) is predicted from previous frame statistics such as macroblock sizes and macroblock costs from a previous frame. For example the initial number of slices may be set to be the same as in the previous frame. In one embodiment, when using real time encoding for preprocessing:

1) Encode the frame with an equal number of macroblocks in each slice.
2) Calculate slice sizes and macroblock sizes by using a decoder (slice_size[i], i $\in$ [0, numSlice); MBSize[j], j $\in$ [0, numMBInFrame))
   When using a VME unit call for the preprocessing stage:
   a. Call "VME" with equal number of macroblocks in each slice.
   b. Set the macroblock size equal to VME macroblock distortions or costs. The costs result from a VME function run. Then the slice size is set to equal to the sum of the macroblock sizes for all blocks in the slice: MBSize[j]=MB_dist[j], j ∈ [0, numMBInFrame)

3) Make equally sized slices according to the following condition (which means pushing macroblocks to the slice until the slice does not exceed average slice size):

$$\sum_{k=o}^{LastMBInSlice[i]} MBSize[k] < avg < \sum_{k=o}^{LastMBInSlice[i]+1} MBSize[k]$$

where $avg$ is $\dfrac{\sum_{i=o}^{LastMBInFrame[i]} MBSize[i]}{numSlices}$; $i \in [0; numSlices - 1)$, so then the sum of macroblock costs in a slice is equal to the average cost.

4) Encode the frame with this slice partitioning and calculate real slice sizes (slice_size[i], i ∈ [0, numSlices])
5) If any slice size exceeds a defined level or if slices are too short (diamond 12, NO path), go to next stage. Criteria for short slices:

$$numSlice > \dfrac{FrameSize * 2}{MaxSliceSize} + 1.$$

Otherwise (diamond 12, YES path) exit at 15.

Recoding 0 (block 14) is intended to redistribute macroblocks between slices to form slices with equal summary macroblock weight (as indicated at (3) below). The macroblock's weight controls its importance to the subjective appearance of the image. It gets slice sizes from the previous stage and makes a new macroblock per slice distribution:

1) Set MaxSliceSize as desired/set by user and MaxSliceWeight=90.0% of MaxSlizeSize as defined by an algorithm to reduce the probability of recoding. The weight is determined to balance between speed (in terms of number of iterations) and quality (in terms of slice size).
2) Calculate weight in percent for each slice:

$$SliceWeight[i] \dfrac{sliceSize[i] * 100.0}{MaxSliceSize}$$

3) Calculate weight in percent for each macroblock:

$$MBWeight[j] \dfrac{MBSize[j] * SliceWeight[i]}{\sum_{k=FirstMBInSlice[i]}^{LastMBInSlice[i]} MBSize[k]}$$

4) Make equally weighted slices according to the following condition (which means pushing macroblocks to the slice till it is not exceed MaxSliceWeight):

$$\sum_{k=FirstMBInSlice[i]}^{LastMBInSlice[i]} MBWeight[k] < MaxSliceWeight, i \in [0; numSlices1 - 1]$$

5) Encode frame and calculate new slice sizes. If the size of any slice exceeds defined level (diamond 16, NO path), go to the next stage. Otherwise (diamond 16, YES path) go to exit 15.

Recoding 1 (block 18) corrects size of slices ("big slices") that still exceed the required limit:

1) After "Recoding0", most of slices meet the maximum size limitation. "Big slices" are divided into two parts using macroblock weight.

$$\dfrac{\sum_{k=FirstMBInSlice[i]}^{LastMBInSlice[i]} MBSize[k]}{2}, weight$$

$$\sum_{k=FirstMBInSlice[i]}^{LastMBInSlice[new]} MBSize[k] \leq weight$$

2) Encode frame and calculate slice sizes. If any slice size exceeds defined level (diamond 20, NO path), go to next stage. Otherwise (diamond 20, YES path) go to exit 15.

Forced mode0 (block 22) is used if there are still "big slices" without the bandwidth or possibility to divide them further. The quanitization parameter (QP) (that defines the quantization level that in turn affects visual quality and bit rate of each frame) is increased in combination with the Recoding 1 mode to reduce the size of such slices. If all sizes are "OK" (diamond 24, YES path) go to exit 15. Otherwise (diamond 24, NO path) proceed to forced mode 1.

Forced mode1 (block 26) is similar to Recoding0 stage with a QP increase. This mode can be used after a few "Forced mode0" calls, especially when number of slices is limited. It rearranges macroblocks in slices that do not belong to "big slices" (reduced by quantization increasing in "forced mode") to reduce number on macroblocks in a "big slice." If all sizes are "OK" (diamond 28, YES path) go to exit 15. Otherwise (diamond 28, NO path) proceed to skip frame (block 30).

In case the required slice size is still not achieved, skip frames (block 30) can be used in a skip mode. One can also skip a slice if hardware supported. This mode guarantees meeting the slice size limitation. Encoded skip frame takes a number of bits (near zero) that is less than MaxSliceSize, because MaxSliceSize must have a reasonable value (e.g. no less than 100 bytes).

In some embodiments, the sequence shown in FIG. 2 may be implemented in software, firmware and/or hardware. In software and firmware embodiments it may be implemented by computer executed instructions stored in one or more non-transitory computer readable media such as magnetic, optical or semiconductor storages. In some embodiments the sequence may be implemented by instructions stored within a graphics processor or within hardware that is part of a graphics processor. For example, the instructions or the hardware may be part of a video motion estimation unit of a graphics processor and particularly with respect to FIG. 1 may be part of the motion estimation block 112 in some embodiments.

Figure 3:
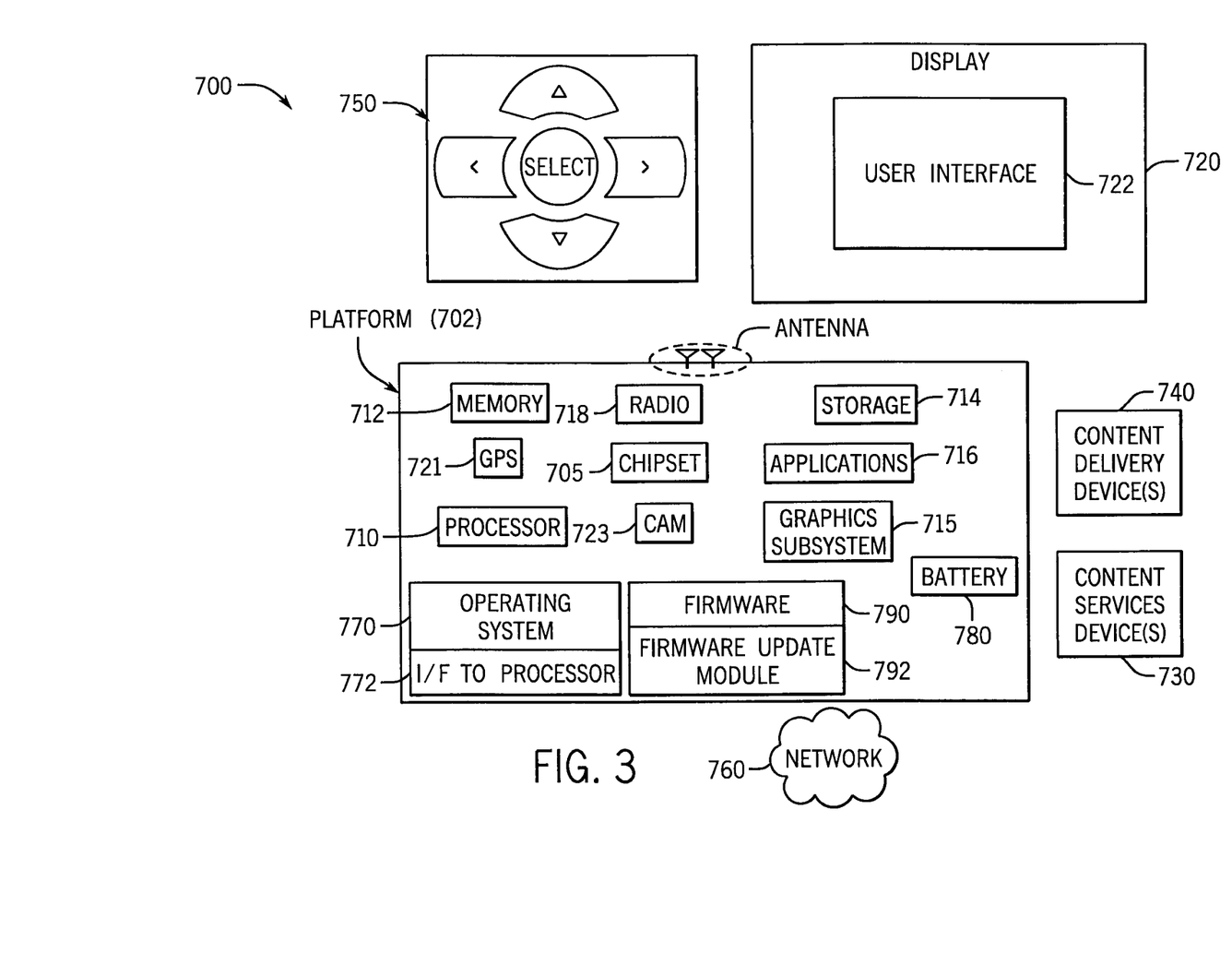
FIG. 3 is a system depiction for one embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 2 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
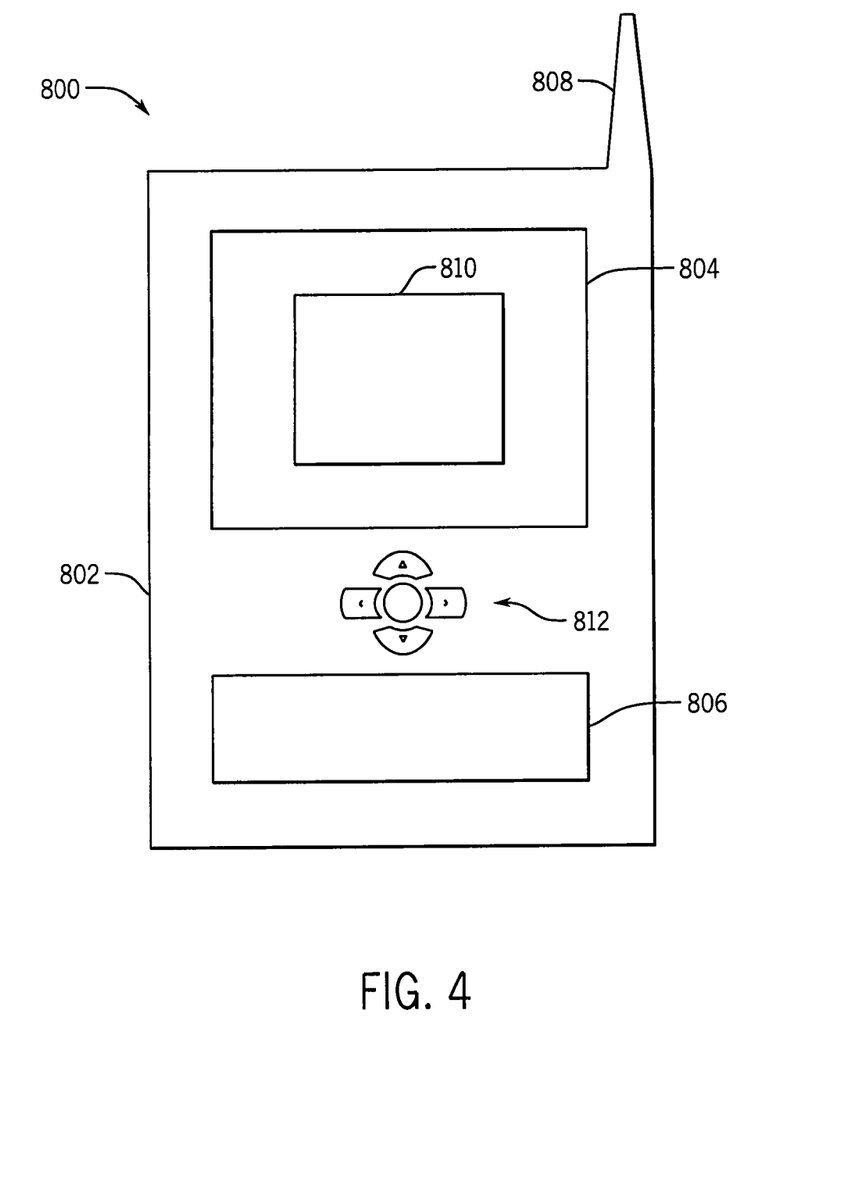
FIG. 4 is a front elevational view for one embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As shown in FIG. 4, device 800 may comprise a housing 802, a display 804 and 810, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The following clauses and/or examples pertain to further embodiments:

One example embodiment may be a computer-implemented method comprising estimating slice sizes based on macroblock statistics, assigning macroblocks to equally sized slices until each slice does not exceed a pre-identified size, redistributing macroblocks between slices to reduce slice size, and if a slice size is still greater than the predefined size, inserting skip frames. The method may also include predicting a number of slices for a frame using statistics from previous frames. The method may also include correcting sizes of slices that still exceed said predefined size by dividing said slices into parts. The method may also include calculating a weight in percent of each macroblock based on macroblock size, sum of macroblock size and slice weight. The method may also include reducing slice size by increasing a quantization parameter.

The method may also include rearranging macroblock assignments to a slice based on the increased quantization parameter. The method may also include iteratively reducing slice sizes. The method may also include estimating a number of iterations that guarantee real time encoding. The method may also include determining whether slices are too short. The method may also include making the sum of macroblock weights in a slice less than a maximum slice weight.

Another example may be one or more non-transitory computer readable media storing instructions for execution by a processor to perform a sequence comprising estimating slice sizes based on macroblock statistics, assigning macroblocks to equally sized slices until each slice does not exceed a pre-identified size, redistributing macroblocks between slices to reduce slice size, and if a slice size is still greater than the predefined size, inserting skip frames. The media may include said sequence including predicting a number of slices for a frame using statistics from previous frames. The media may include said sequence including correcting sizes of slices that still exceed said predefined size by dividing said slices into parts. The media may include said sequence including calculating a weight in percent of each macroblock based on macroblock size, sum of macroblock size and slice weight. The media may include said sequence including reducing slice size by increasing a quantization parameter. The media may include said sequence including rearranging macroblock assignments to a slice based on the increased quantization parameter. The media may include said sequence including iteratively reducing slice sizes. The media may include said sequence including estimating a number of iterations that guarantee real time encoding. The media may include said sequence including determining whether slices are too short. The media may include said sequence including making the sum of macroblock weights in a slice less than a maximum slice weight.

In another example embodiment may be an apparatus comprising a processor to estimate slice sizes based on macroblock statistics, assign macroblocks to equally sized slices until each slice does not exceed a pre-identified size, redistribute macroblocks between slices to reduce slice size, and if a slice size is still greater than the predefined size, insert skip frames, and a storage coupled to said processor. The apparatus may include said processor to predict a number of slices for a frame using statistics from previous frames. The apparatus may include said processor to correct sizes of slices that still exceed said predefined size by dividing said slices into parts. The apparatus may include said processor to calculate a weight in percent of each macroblock based on macroblock size, sum of macroblock size and slice weight. The apparatus may include said processor to reduce slice size by increasing a quantization parameter. The apparatus may include said processor to rearrange macroblock assignments to a slice based on the increased quantization parameter. The apparatus may include said processor to iteratively reduce slice sizes. The apparatus may include a display communicatively coupled to the circuit. The apparatus may include a battery coupled to the circuit. The apparatus may include firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A computer-implemented method comprising:
    prior to initiation of encoding of a frame:
        determining a plurality of slices in the frame;
        assigning an equal number of macroblocks to each slice of the plurality of slices;
        determining, using a hardware motion estimation unit, macroblock sizes of the macroblocks assigned to the plurality of slices, wherein each macroblock size is based on macroblock costs generated by the hardware motion estimation unit;
        redistributing, based on the determined macroblock sizes, the macroblocks between the plurality of slices to equalize slice sizes of the plurality of slices, wherein each slice size is a sum of the macroblock sizes of the macroblocks assigned to one of the plurality of slices; and
    after redistributing the macroblocks between the plurality of slices, encoding the frame based on the redistributed macroblocks of the plurality of slices to obtain a first encoded frame.

2. The method of claim 1, wherein determining the plurality of slices in the frame comprises predicting a total number of slices for the frame using statistics from previous frames.

3. The method of claim 1 including:
    determining actual sizes of the plurality of slices in the first encoded frame.

4. The method of claim 3 including:
    determining whether any slices in the first encoded frame have actual sizes that exceed a defined slice size; and
    in response to a determination that at least one slice in the first encoded frame has an actual size that exceeds the defined slice size, reducing the slice sizes of the plurality of slices based on a first reduction amount.

5. The method of claim 4 including reducing the slice sizes by increasing a quantization parameter.

6. The method of claim 5 including rearranging macroblock assignments to the plurality of slices based on the increased quantization parameter.

7. The method of claim 4 including:
    after reducing the slice sizes, encoding the frame to obtain a second encoded frame.

8. The method of claim 7 including:
    determining actual sizes of the plurality of slices in the second encoded frame.

9. The method of claim 8 including:
    determining whether any slices in the second encoded frame have actual sizes that exceed the defined slice size; and in response to a determination that at least one slice in the second encoded frame has an actual size that exceeds the defined slice size, reducing the slice sizes of the plurality of slices based on a second reduction amount, wherein the second reduction amount is greater than the first reduction amount.

10. One or more non-transitory computer readable media storing instructions for execution by a processor to perform a sequence comprising:

prior to initiation of encoding of a frame:
determining a plurality of slices in the frame;
assigning an equal number of macroblocks to each slice of the plurality of slices;
determining, using a hardware motion estimation unit, macroblock sizes of the macroblocks assigned to the plurality of slices, wherein each macroblock size is based on macroblock costs generated by the hardware motion estimation unit;
redistributing, based on the determined macroblock sizes, the macroblocks between the plurality of slices to equalize slice sizes of the plurality of slices, wherein each slice size is a sum of the macroblock sizes of the macroblocks assigned to one of the plurality of slices; and
after redistributing the macroblocks between the plurality of slices, encoding the frame based on the redistributed macroblocks of the plurality of slices to obtain a first encoded frame.

11. The media of claim 10, wherein determining the plurality of slices in the frame comprises predicting a total number of slices for the frame using statistics from previous frames.

12. The media of claim 10, said sequence including:
determining actual sizes of the plurality of slices in the first encoded frame.

13. The media of claim 12, the sequence including:
determining whether any slices in the first encoded frame have actual sizes that exceed a defined slice size; and
in response to a determination that at least one slice in the first encoded frame has an actual size that exceeds the defined slice size, reducing the slice sizes of the plurality of slices based on a first reduction amount.

14. The media of claim 13, said sequence including reducing the slice sizes by increasing a quantization parameter.

15. The media of claim 14, said sequence including rearranging macroblock assignments to the plurality of slices based on the increased quantization parameter.

16. The media of claim 13, the sequence including:
after reducing the slice sizes, encoding the frame to obtain a second encoded frame.

17. The media of claim 16, said sequence including:
determining whether any slices in the second encoded frame have actual sizes that exceed the defined slice size; and
in response to a determination that at least one slice in the second encoded frame has an actual size that exceeds the defined slice size, reducing the slice sizes of the plurality of slices based on a second reduction amount, wherein the second reduction amount is greater than the first reduction amount.

18. An apparatus comprising:
a processor to:
prior to initiation of encoding of a frame:
determine a plurality of slices in the frame;
assign an equal number of macroblocks to each slice of the plurality of slices;
determine, using a hardware motion estimation unit, macroblock sizes of the macroblocks assigned to the plurality of slices, wherein each macroblock size is based on macroblock costs generated by the hardware motion estimation unit;
redistribute, based on the determined macroblock sizes, the macroblocks between the plurality of slices to equalize slice sizes of the plurality of slices, wherein each slice size is a sum of the macroblock sizes of the macroblocks assigned to one of the plurality of slices; and
after redistribution of the macroblocks between the plurality of slices, encode the frame based on the redistributed macroblocks of the plurality of slices to obtain a first encoded frame; and
a storage coupled to said processor.

19. The apparatus of claim 18, said processor to predict a number of slices for a frame using statistics from previous frames.

20. The apparatus of claim 18, said processor to determine actual sizes of the plurality of slices in the first encoded frame.

21. The apparatus of claim 20, said processor to:
determine whether any slices in the first encoded frame have actual sizes that exceed a defined slice size; and
in response to a determination that at least one slice in the first encoded frame has an actual size that exceeds the defined slice size, reduce the slice sizes of the plurality of slices based on a first reduction amount.

22. The apparatus of claim 21, said processor to reduce the slice sizes by increasing a quantization parameter.

23. The apparatus of claim 22, said processor to rearrange macroblock assignments to the plurality of slices based on the increased quantization parameter.

24. The apparatus of claim 21, said processor to:
after reducing the slice sizes, encode the frame to obtain a second encoded frame; and
in response to a determination that at least one slice in the second encoded frame has an actual size that exceeds the defined slice size, reducing the slice sizes of the plurality of slices based on a second reduction amount, wherein the second reduction amount is greater than the first reduction amount.

\* \* \* \* \*